United States Patent [19]

Lyon

[11] 4,037,049

[45] July 19, 1977

[54] MODULATOR AND DEMODULATOR FOR DATA COMMUNICATIONS NETWORK

[75] Inventor: David L. Lyon, Cambridge, Mass.

[73] Assignee: Intertel, Inc., Burlington, Mass.

[21] Appl. No.: 515,878

[22] Filed: Oct. 18, 1974

[51] Int. Cl.² .............................................. H04L 27/18
[52] U.S. Cl. ........................................ 178/67; 325/30
[58] Field of Search ............. 178/67, 66 R; 325/38 A, 325/30, 320

[56] References Cited

U.S. PATENT DOCUMENTS

| | | | |
|---|---|---|---|
| 3,706,945 | 12/1972 | Yanagidaira et al. | 178/66 R |
| 3,764,743 | 10/1973 | Melvin | 178/67 |
| 3,805,191 | 4/1974 | Kawai et al. | 178/66 R |
| 3,845,412 | 10/1974 | Rearwin | 178/67 |
| 3,887,768 | 6/1975 | Forney, Jr. | 178/67 |

*Primary Examiner*—Robert L. Griffin
*Assistant Examiner*—Michael A. Masinick
*Attorney, Agent, or Firm*—Cesari and McKenna

[57] ABSTRACT

A modem with transmitter and receiver sections. Incoming digital data signals produce successive coordinate signals to define successive transmission points representing a given digital value and to modulate quadrature carrier signals. The coordinate signals have unit values of 0, 1, 2.707, 3 and 5 and together control the amplitude and phase of the modulated carrier signals. The receiver section uses received coordinate signals, after they are properly conditioned, to select a decision region which corresponds to a transmission point to produce the digital data signals. The decision regions have rectilinear boundaries on a Cartesian coordinate system at unit values 0, 1.25, 2 and 4 and each region is either rectangular or non-rectangular. Digital synchronism between separate modems is maintained by transmitting coordinate signals corresponding to a framing point which is separate from the transmission points, but which has the same digital value as a transmission point. Certain decision regions defined by the receiver use the receipt of the modulated carrier signals corresponding to a framing point to initiate a synchronizing operation.

11 Claims, 10 Drawing Figures

MODEM TRANSMITTER

MODEM RECEIVER

FIG. 5

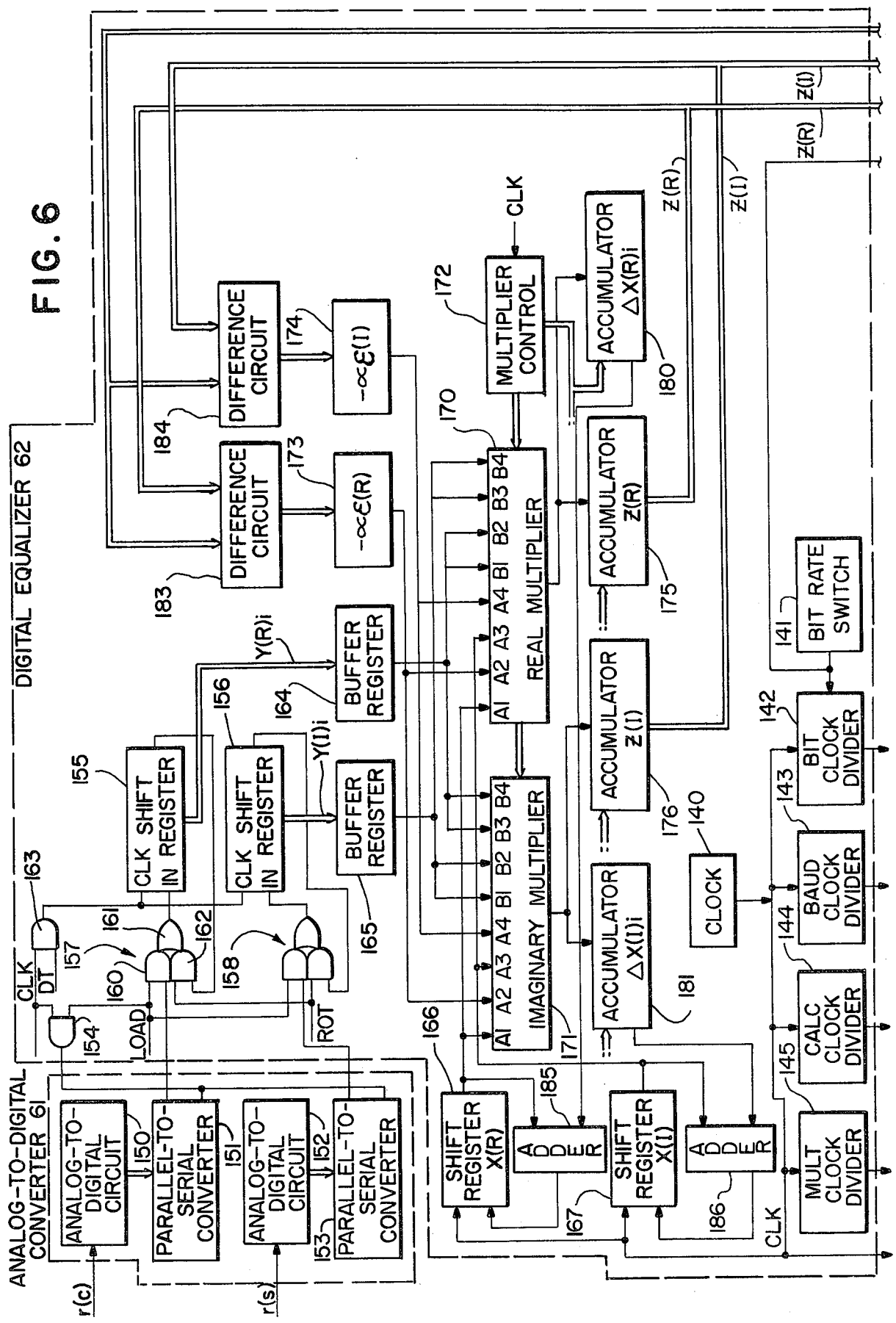

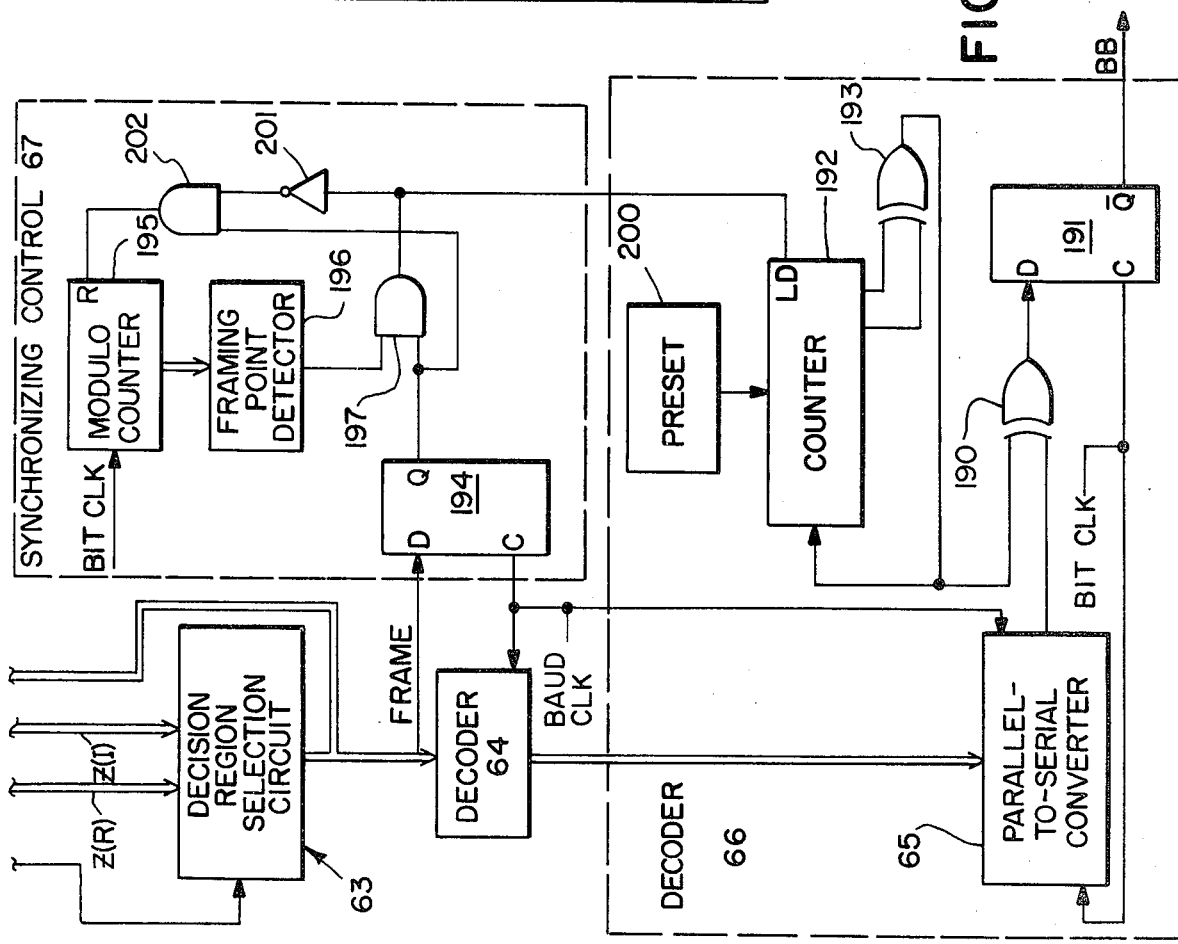

MODULATOR AND DEMODULATOR FOR DATA COMMUNICATIONS NETWORK

BACKGROUND OF THE INVENTION

This invention generally relates to modulated carrier communications networks and more specifically to networks which require a data transmitter and receiver to operate synchronously.

Modulated carrier data communications networks convey data between a central site and one or more remote sites over telephone lines or other communications links. The central site typically comprises a digital data transmitter and receiver, such as a digital computer and its associated input/output control system. Each remote site also comprises a digital data transmitter and receiver, such as a peripheral unit.

At the central site, a modulator circuit receives the digital data from the central site transmitter and converts the data to appropriately modulated carrier signals for transmission over a data transmission path to a designated remote site. At the remote site, a demodulator circuit receives the incoming modulated carrier signal and converts it back to its original digital form for use by the data receiver. Similarly, a data transmitter at a remote site supplies data to its modulator for conversion to modulated carrier signals for transmission back to the central site where a demodulator converts the incoming modulated carrier signal back into digital form for the data receivers at the central site. Generally, a modulator circuit and a demodulator circuit at each site are packaged together in a "modem."

A single data transmitter and receiver at a central site may communicate with one or more remote sites, or "drops" over one or more separate communications links. Each communications link couples a central modem and a number of drops. Appropriate circuits at the central site and each remote site enable any one remote site to communicate with the central site at any given time.

In a typical communications network, the central site is connected to each remote site over a transmission link comprising one or two pairs of transmission lines to enable "full-duplex" or "half-duplex" operation, respectively. When a link comprises two pairs of transmission lines for full duplex operation, one pair carries modulated carrier signals to all remote sites while the other pair carries modulated carrier signals from the remote sites to the central site. In a half-duplex operation one pair of transmission lines carries all modulated carrier signals. These "lines" are not merely two pairs of conductors. Rather, they include switching elements, amplifier elements, and other circuit elements as well as conductor elements which are common to telephone lines. All of these elements are subject to various influences which degrade the transmission characteristics of the line and distort the modulated carrier signal. These influences evidence themselves as the following:

1. additive noise including thermal noise, noise due to switching operations and noise due to atmospheric disturbances;
2. harmonic distortion;
3. frequency offsets introduced by telephone company equipment as it performs frequency division multiplexing operations; it is manifested by a difference between the carrier frequencies at the transmitting and receiving modems;
4. phase jitter which is the rapid changing of frequency offset with time; and
5. bandwidth limitations of the telephone transmission link which introduce linear distortion.

There are many schemes for transferring data in a communications network, characterized by any one or a combination of amplitude, phase or frequency modulating techniques. Generally, these techniques are developed assuming a transmission link which is subjected to only one influence, as opposed to real transmission links which are subject to some or all of the above-mentioned influences. Additive noise commonly is selected because it can be analyzed mathematically and is easy to consider from a theoretical standpoint. However, the different sources of line degragation affect the transmission link differently and minimizing the effect of noise does not necessarily minimize the effects of harmonic distortion, frequency offset, phase jitter or the limited bandwidth. Recently, some attempts have been made to optimize transmitter design with respect to noise and phase jitter, but the receiver design has been optimized only with respect to noise.

There are two approaches for solving or devising a modulating and demodulating technique for a data communications network: a mathematical approach and an empirical approach. Mathematical solutions generally do not provide good overall performance. Furthermore, they often produce decision regions and transmission points which are not symmetrical. Without symmetry, separate circuits corresponding to each decision region and corresponding transmission point may be necessary. These approaches, therefore, lead to costly circuits of less than ideal performance.

Empirical designs are based upon various mathematical principles to some degree. However, the consideration of producing an easily implemented design is overriding. Performance thus is often sacrificed in order to obtain symmetry and to simplify the circuits. However, the resulting circuits are affected adversely by moderate additive noise and phase jitter.

Therefore, it is an object of this invention to provide a technique for modulating and demodulating signals in a data communications network in which overall performance is improved.

Still another object of this invention is to provide a technique for modulating and demodulating signals in a data communications network which improves performance with minimal increase in expense.

Still another object of this invention is to provide a modulating and demodulating technique for data communications networks which improves overall network performance in response to distorted signals from degraded transmission lines.

SUMMARY

In accordance with this invention, a transmitter encodes incoming digital data to produce coordinate signals for preselected positions, or transmission points, within defined decision regions. An incoming modulated carrier signal to a receiver is demodulated to produce received coordinate signals which represent the modulation information on the carrier signal The receiver uses these received coordinate signals to identify a decision region. Each decision region corresponds to a predetermined digital value and has rectilinear boundaries. Each boundary is parallel to one of the axes in a single Cartesian coordinate system. A particular decision region may be rectangular or non-rectangular in shape. Once a decision region is selected, its corresponding digital value is used to provide the digital data for use by the digital data receiver.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 4 comprising

FIG. 5 is a detailed drawing of a portion of a circuit shown in FIG. 2 which operates in accordance with this invention;

FIG. 6, including FIG. 6A, is a detailed diagram of a portion of a circuit shown in FIG. 3 for operation in accordance with this invention; and FIG. 7 is a chart useful in understanding the operation of the circuit in FIG. 6.

DESCRIPTION OF AN ILLUSTRATIVE EMBODIMENT

Figure 1:
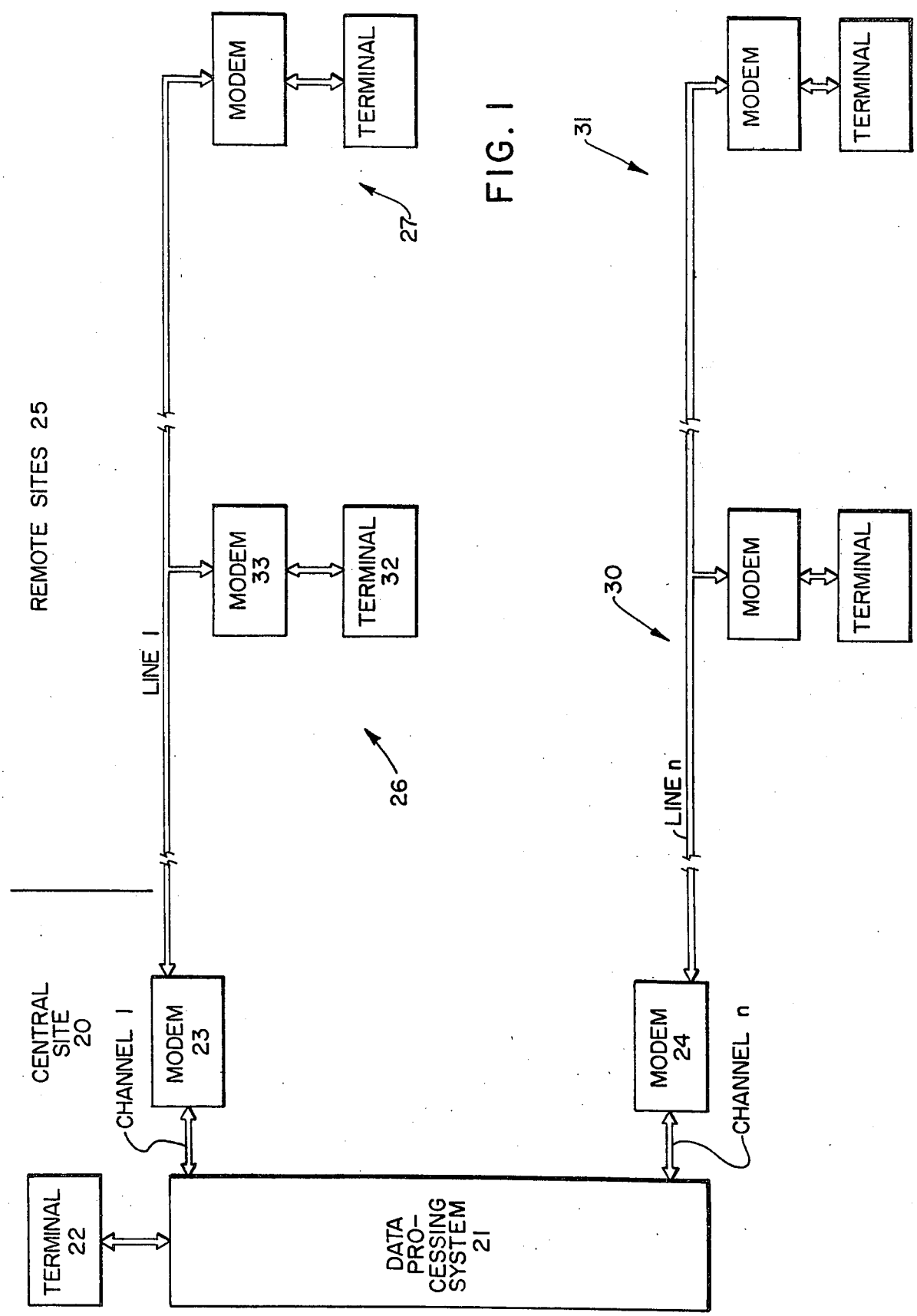
FIG. 1 is a diagram of a data communications network adapted for using this invention.

In accordance with conventional practice, a data communications network operates under the control of the equipment at a central site 20 as shown in FIG. 1. A typical central site 20 includes a data processing system 21 and central input/output devices represented by a terminal 22. The data processing system 21 includes data communications circuits for transmitting and receiving digital data over a plurality of input/output channels. FIG. 1 shows CHANNEL 1 connected to a modulator-demodulator circuit (i.e., modem) 23; CHANNEL n connects to a modem 24. The data processing system controls the transfer of information over these and other channels in order to communicate with specific remote sites 25. Remote sites 26 and 27 are examples of sites connected to LINE 1 coming from modem 23, while remote sites 20 and 31 connect to LINE n coming from modem 24. Typically, the data processing system 21 uses a polling sequence to select remote sites in order. For example, the system 21 could select CHANNEL 1, identify terminal 32, and communicates with the terminal 32 through modems 23 and 33. During such communications, the modem 23 receives the digital data and encodes and modulates it onto a carrier for transmission along LINE 1. At remote site 26 the modem 33 receives the incoming signal from LINE 1 and demodulates and decodes it. The resulting digital data identifies the terminal 32 and enables a transfer to occur. All modems at remote sites connected to LINE 1 receive signals from modem 23.

When the terminal 32 transmits data back to the data processing system 21, the modem 33 encodes and modulates that data using either a carrier frequency which is different from the carrier frequency transmitted by the modem 23 in a two-wire or half-duplex network or, in a four-wire or full duplex network, the same frequency but on a different set of wires. All remote sites have the same general configuration. Further, the general operation of such data communications networks is well known in the art and no further discussion is necessary. Such networks also operate in response to signals which pass between a modem and terminal. These are standard signals; and, with specific reference to the terminal 32 and modem 33, two such signals important in understanding this invention include:

| LEAD DESIGNATION | SIGNAL DESCRIPTION |
|---|---|
| BA | Digital data transmitted from the terminal 32 to the modem 33 |
| BB | Digital data transmitted from the modem 33 to the terminal 32 |

Figure 2:
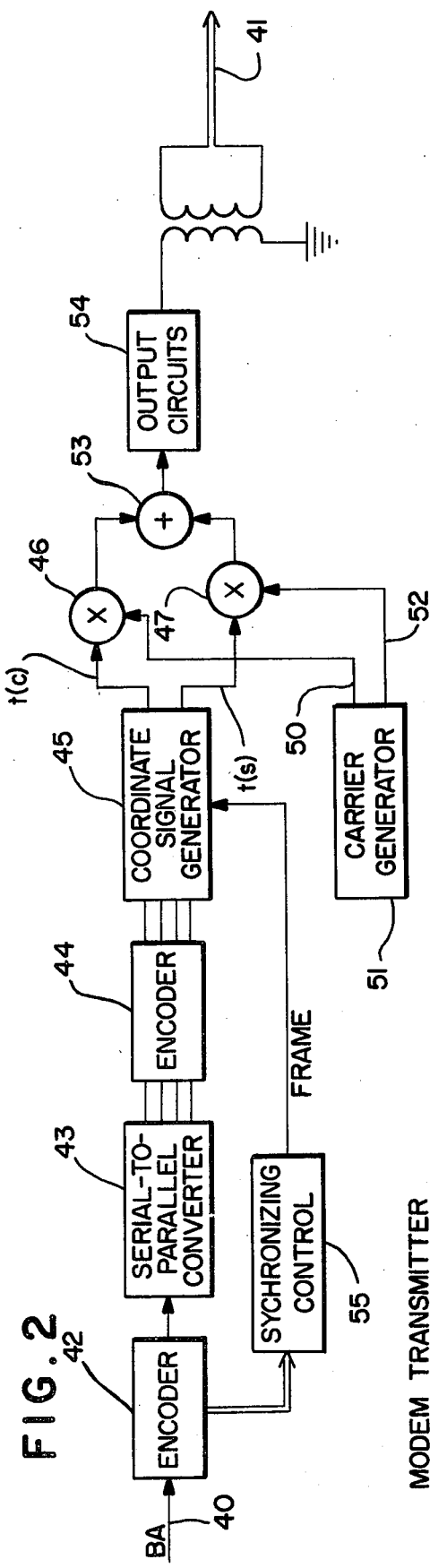
FIG. 2 is a block diagram of a transmitter of use in a specific embodiment of a modem shown in the circuit of FIG. 1.

FIG. 2 depicts, in block form, a modem transmitter that might be used in modem 33 in FIG. 1. It receives data in serial digital form from a terminal 32 over the BA lead 40 shown in FIG. 2. The incoming data arrives at a known bit rate (e.g., 9600 bits per second) and is converted for transmission as a modulated carrier signal onto a transmission link 41, such as LINE 1 in FIG. 1. A typical modulated carrier signal includes an amplitude and phase modulated 1800 Hz carrier.

The incoming digital data on the BA lead 40 is received by an encoder 42 which provides digital synchronism, and, as described later, scrambles, or encodes, the data to minimize the chance of a repetitive data pattern. A serial-to-parallel converter 43 receives sequences of encoded digital bits in series and periodically produces output bytes comprising successive bit sequences. For example, if a byte comprises four bits, the converter 43 receives bits in serial fashion at the 9600 bit per second rate and issues bytes comprising four parallel bits at a 2400 baud rate.

Another encoder 44 receives successive bytes from the converter 43 at the baud rate; the encoder 44 may include both Gray and differential encoding circuits. In one specific embodiment, two of the four bits in each byte from the converter 43 (namely, $a_1$ and $a_2$ bits) control which of the four possible phases of the modulated carrier signal will be used while the $a_3$ and $a_4$ bits control which of four possible amplitudes will be used. In accordance with conventional differential encoding techniques, the encoder 44 adds a pair of incoming bits to the corresponding existing output bits and transmits to a coordinate signal generator 45 the sum of those bits as next bits in succession. This eliminates the need to ascertain the exact phase of a carrier signal at the receiver. Rather, the change of phase from one signalling interval to another is the only quantity to be determined. In this embodiment, the $a_1$ and $a_2$ bits are coupled to the differential encoder. Further, a Gray encoder encodes each phase bit to reduce the potential for bit errors in response to disturbances on the line.

The coordinate signal generator 45 operates at the baud rate to produce $t(c)$ and $t(s)$ analog coordinate signals dependent upon the values of successive bytes supplied from the encoder 44. The $t(c)$ and $t(s)$ signals from the coordinate signal generator 45 are filtered signals based upon discrete changes in the state of the generator 45 as it receives the successive bytes and selects corresponding predetermined transmission points. These $t(c)$ and $t(s)$ signals thus are real and imaginary component signals respectively and modulate, in modulators 46 and 47, a carrier component on a lead 50 from a carrier generator 51 and another carrier component on a lead 52, normally displaced 90° in phase from the component on line 50. A summing circuit 53 combines the modulated carrier component signals and output circuits 54, which include various filter, driving and impedance matching circuits, couple the composite modulated carrier signal onto the transmission link 41. This composite signal is commonly known as a quadrature amplitude-modulated signal.

Except as modified in accordance with this invention and described in more detail hereinafter, the foregoing circuits are all conventional circuits used in modem transmitters. The modem transmitter shown in FIG. 2, however, also contains a synchronizing control 55 which monitors the state of the encoder 42 and other transmitter conditions and transmits a FRAME signal. Normally the coordinate signal generator 45 produces the $t(c)$ and $t(s)$ coordinate signals which, as also described more fully hereinafter, are taken from a first set of values or normal transmission points. The receiver in FIG. 3 uses decision regions to decode the incoming signal and select a nominal point. Each decision region "surrounds" each nominal point, and each nominal point corresponds to one of the possible transmission points which are supplied from the encoder 44 to the coordinate signal generator 45 in the transmitter. In the case of four-bit bytes, there are 16 potential transmission points and the receiver uses 16 decision regions.

Whenever the synchronizing control 55 in FIG. 2 transmits the FRAME signal, the coordinate signal generator 45 indicates the presence of the FRAME signal by transmitting $t(c)$ and $t(s)$ coordinate signals which are used by the receiver to identify one of a second set of decision regions corresponding to a second set of transmission points called "framing points." Each framing point and corresponding decision region has a digital value which corresponds to a digital value of one of the normal transmission points.

Figure 3:
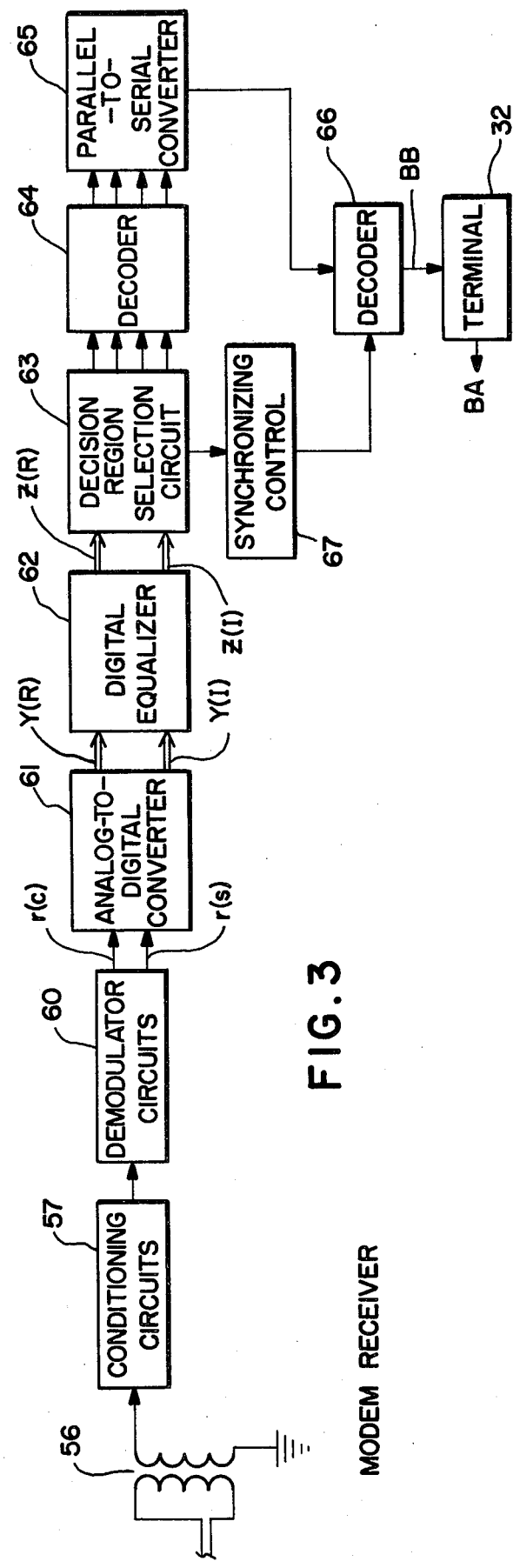
FIG. 3 is a block diagram of a receiver for use in a specific embodiment of the modem shown in FIG. 1.

Now referring to FIG. 3, the incoming modulated carrier signal on the transmission link 56 is coupled to conditioning circuits 57 which include various filter, fixed equalizer and automatic gain control circuits. The conditioned modulated carrier signals are then applied to demodulator circuits 60 which include demodulators, oscillators and sampling circuits for obtaining from the modulated carrier signal, $r(c)$ and $r(s)$ received coordinate signals which correspond to the $t(c)$ and $t(s)$ coordinate signals from the coordinate signal generator 45 in the transmitter (FIG. 2).

An analog-to-digital converter 61 converts the $r(c)$ and $r(s)$ signals to Y(R) and Y(I) binary signals. A digital equalizer 62 converts the Y(R) and Y(I) signals into binary Z(R) and Z(I) signals which the decision region selection circuit 63 uses to select one of the possible decision regions. When a decision region is selected during each baud, the circuit 63 transmits to a decoder 64 a four-bit byte representing the digital value of the selected region. This byte corresponds to the output of of the encoder 44 in FIG. 2. The decoder 64 performs the inverse function of the encoder 44 and a parallel-to-serial converter 65 converts the parallel bits into a serial format for energizing a decoder 66. The decoder 66 provides a decoding function corresponding to the encoding function performed by encoder 42 and responds to signals from the synchronizing control 67 which monitors conditions in the decision region selection circuit 63. The output of the decoder 66 is the BB signal, i.e., the digital data signal coupled to the terminal 32.

Figure 4A:
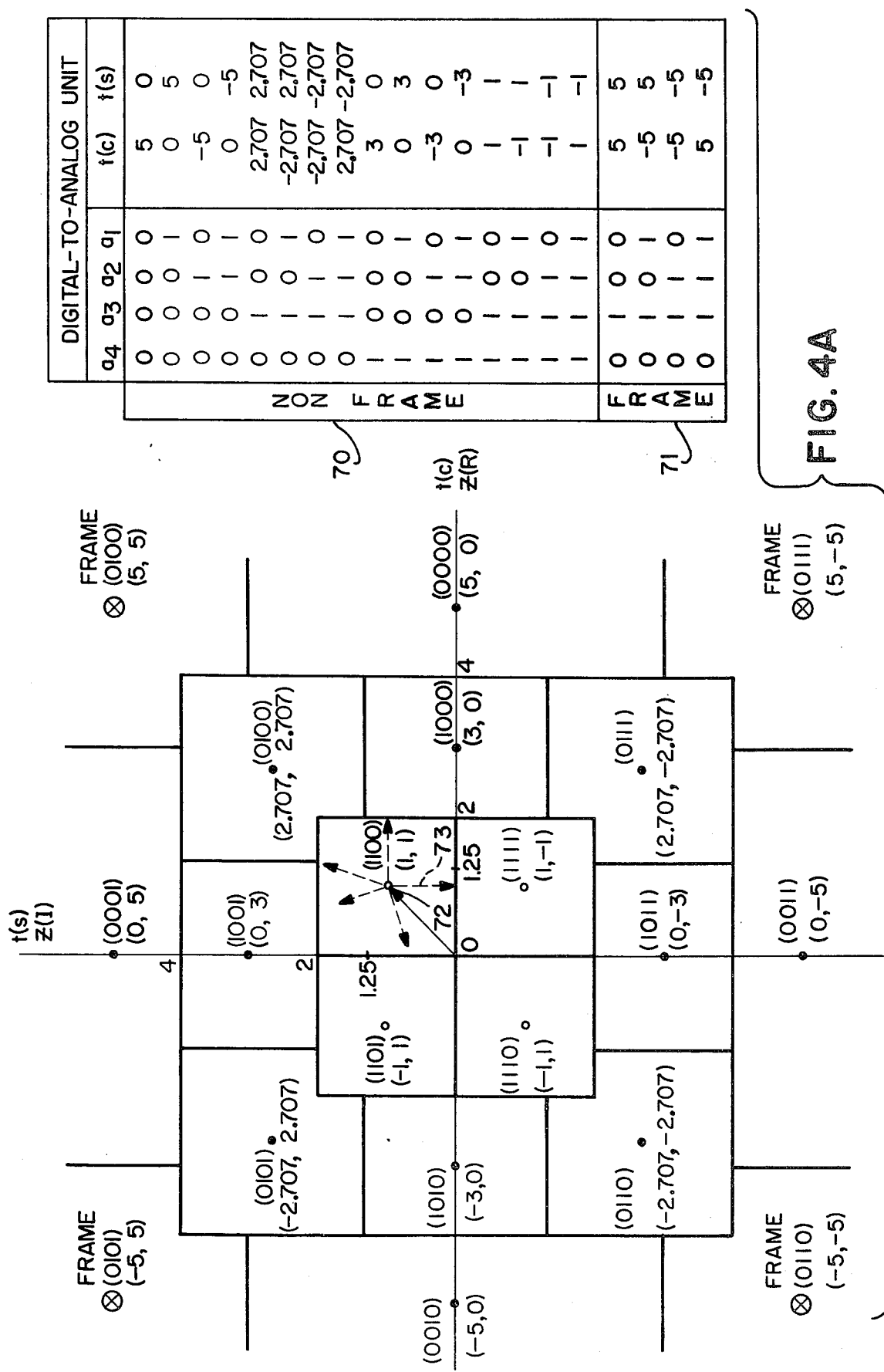
FIGS. 4A, 4B and 4C is a graphic representation of encoding points and decision regions useful in understanding this invention.

FIG. 4A shows an arrangement of transmission points and decision regions. The transmitter uses the points to produce the $t(c)$ and $t(s)$ signals. The receiver in FIG. 3, and specifically the selection circuit 63, uses the boundaries and Z(R) and Z(I) signals to produce the digital values that are passed on to the decoder 64. FIG. 4A depicts twenty possible transmission points and decision regions. Sixteen of these, identified by digital values 0000 through 1111, correspond to the sixteen potential transmission points from the encoder 44 in FIG. 2. The remaining points and decision regions correspond to framing points identified as FRAME (0100) through FRAME (0111).

Still referring to FIG. 4A, the decision regions are defined on a Cartesian coordinate system in which the Z(R) values represent the magnitudes of the in-phase or cosine components and the Z(I) values represent the magnitude of the quadrature or sine components of the received modulated carrier. Consequently, the length of a vector from the origin to any point corresponds to the magnitude of the carrier and the angle between the Z(A) axis and the vector represents the phase angle. The boundaries on each decision region are rectilinear; that is, the boundaries are straight lines parallel to the axes. Decision regions corresponding to digital values 1100 through 1111, 1000 through 1011, and 0000 through 0011 are rectangular. The remaining decision regions, corresponding to digital values 0100 through 0111 and FRAME 0100 through FRAME 0111, are not rectangular.

FIG. 4A also depicts in tabular and graphical form, the nominal normalized values for each transmission and framing point and boundaries surrounding each decision region. The table is divided into a "non-frame" section 70 in which the byte values are represented by a first set of coordinate signal component values and a "frame" section 71 in which certain of the byte values are represented by a second set of coordinate signal component values. Referring first to the non-frame section 70, each transmission point component has one of five normalized magnitudes: 8, 1, 2.707, 3 and 5. Furthermore, each component may have positive or negative polarity. Each unit of magnitude represents a base voltage used to provide the $t(c)$ and $t(s)$ coordinate signals at the output of coordinate signal generator 45 (FIG. 2). In the graph of FIG. 4A, a vector 72 represents the transmitted signal corresponding to the digital value 1100. Random additive noise and harmonic distortion are represented by various dashed line vectors 73 appended to the vector 72. The received signal is the vector sum of the transmitted signal and the additive noise and harmonic distortion. Thus, each decision region represents the acceptable range of magnitudes over which the component signals may vary for a given transmission point and over which the receiver will provide the correct digital value. The decision region for coordinates 1,1 extends between normalized 0 and 2 values on the axes. The other boundaries have normalized magnitudes of 1.25 and 4. Thus, a normalized unity vector can be added to the vector 72 without leaving the decision region. The base unit voltage is determined in part by acceptable performance for given magnitudes of additive noise and harmonic distortion.

The other influences which degrade the transmission link, including frequency offset and phase jitter, tend to shift the phase of the incoming signal, and this manifests itself as a rotation of the vector 72 about the origin. With the specific arrangement shown in FIG. 4A, a phase shift of approximately 26° can be tolerated by the receiver. That is, the tip of the vector will not cross over a boundary into another decision region, unless the vector is rotated by 26°.

Another factor in selecting a base unit voltage is the maximum average and maximum instantaneous power levels which can be accomodated by the transmission link. When the coordinate signals have a normalized value of 5 and the resulting power is within maximum average limit, the instantaneous power transmitted during a framing or synchronizing operation is within the maxiumum instantaneous power limit.

Still referring to FIG. 4A, each transmission point lies in one of four circles and all points lying on a given circle have the same $a_3$ and $a_4$ bits. Thus, when $a_4=1$ and $a_3=1$, the four corresponding transmission points lie on a circle whose radius is $\sqrt{2}$. When $a_4=1$ and $a_3=0$, the circle has a radius of 3; for $a_4=0$ and $a_3=1$, a radius of approximately 3.8; and for $a_4=0$ and $a_3=0$, the radius is 5. Thus, as previously stated, the $a_3$ and $a_4$ bits from the encoder 44 in FIG. 2 are termed "amplitude bits." Conversely, $a_1$ and $a_2$ bits determine the positions on the circles and are therefore "phase bits."

Figures 4B, 4C:
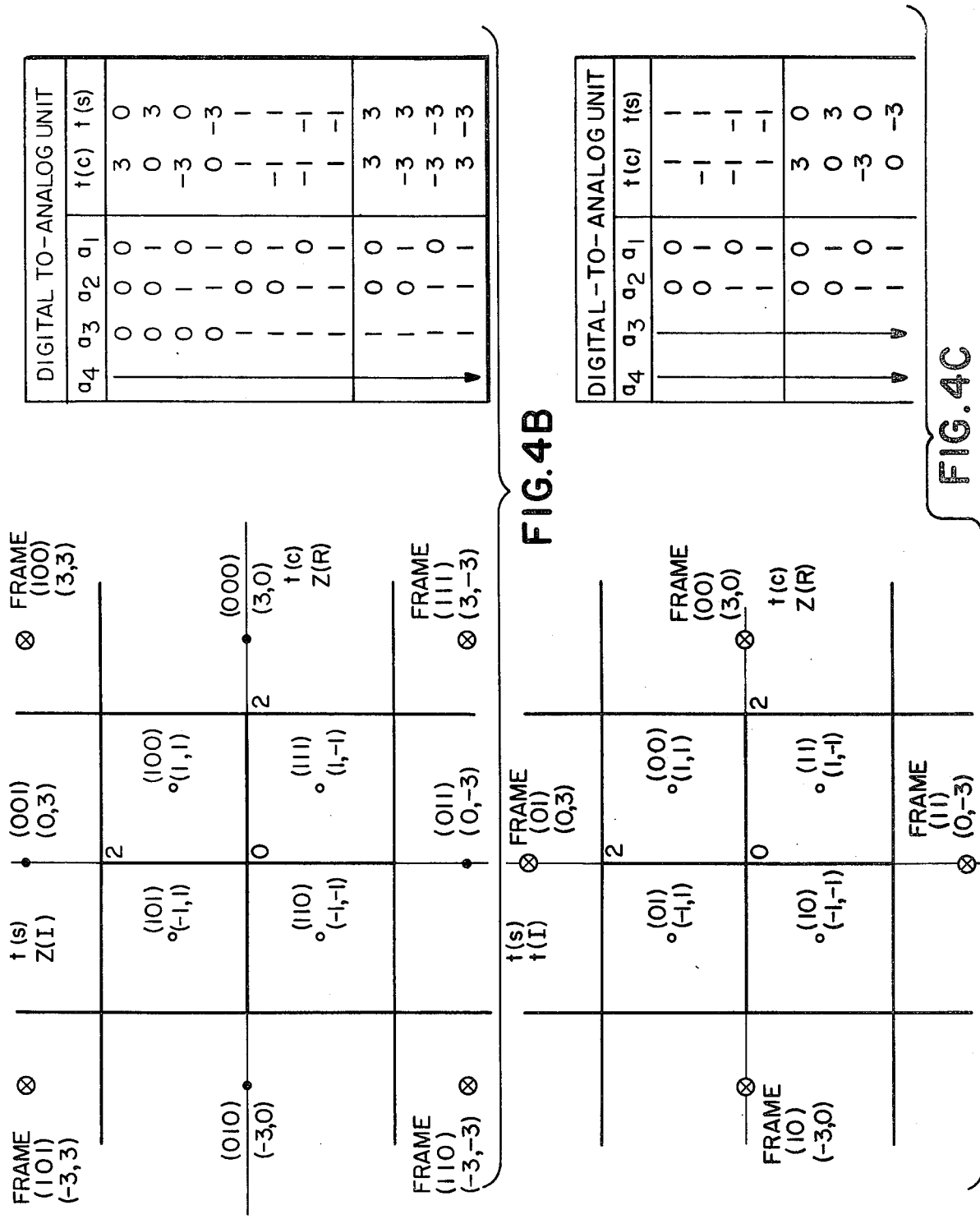

The arrangement of decision regions shown in FIG. 4A is also adapted to enable the incoming data rate to be changed. FIG. 4B, for example, illustrates the effect of disregarding or "stripping" the $a_4$ bit from successive bytes from the encoder 44. The resulting eight points and decision regions and four framing points and regions are shown in FIG. 4B. The $a_3$ bit is an amplitude bit and it distinguishes two possible radii, while the $a_1$ and $a_2$ bits again control phase. If the circuit shown in FIG. 2 is adapted to receive incoming digital data bits on the BA lead 40 at 9600 bits per second, then modifying the circuit to operate with three-bit bytes enables the transmitter in FIG. 2 to receive data at an incoming rate of 7200 bits per second.

Stripping both the $a_3$ and $a_4$ amplitude bits from the encoder 44 enables the transmitter in FIG. 2 to operate at 4800 bits per second. As shown in FIG. 4C, there is then only one circle for the four points. Therefore, only the $a_1$ and $a_2$ phase bits are necessary to provide the four possible binary combinations for the 4800 bit system. The structure for performing this operation is described more fully with reference to FIG. 5.

Figure 5:
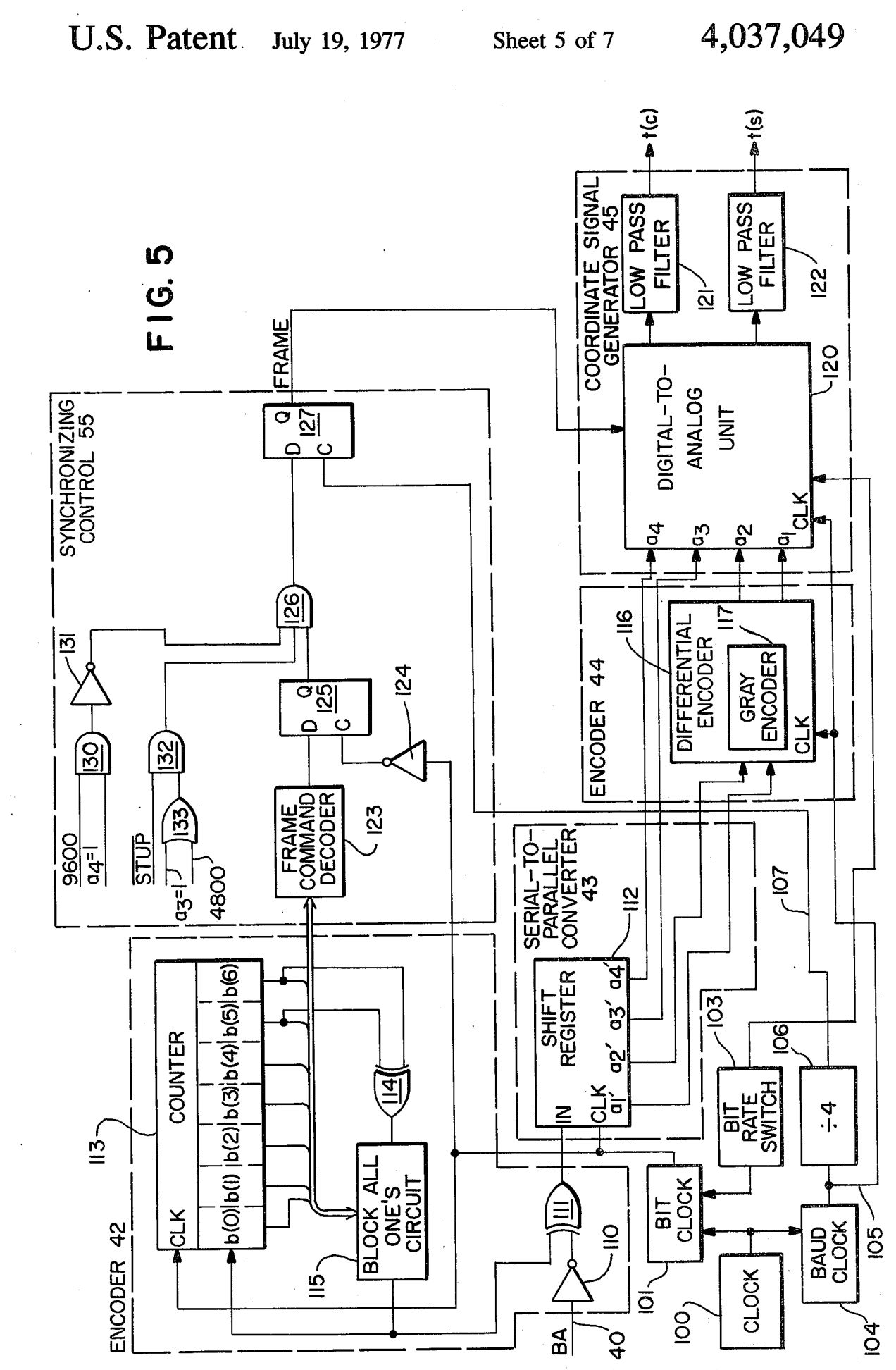

Now referring to FIG. 5, a clock 100 provides the basic timing in the transmitter. A bit clock divider 101 produces bit clock pulses at the incoming data bit rate on the BA lead 40. A bit rate switch 103 controls the division in the divider 101. A baud clock divider 104 produces clock pulses on a lead 105 at the baud rate. If the bit rate is 9600 bits per second and the parallel converter 43 transmits four bits in parallel, then the baud rate is 2400 Hz. A "divide-by-four" circuit 106 receives the baud rate pulses and produces on a lead 107 a clocking signal at one-quarter the baud rate (e.g., 600 Hz).

After the incoming data on the BA lead 40 passes through an inverter 110 in the encoder 42, it is combined with an encoding signal in an exclusive OR circuit 111 before being fed into a shift register 112 in the serial-to-parallel converter 43 under the control of the bit clock pulses. The other input of the exclusive OR circuit 111 is the output of a pseudo-random number generator. It includes a counter 113 and an exclusive OR circuit 114 which feeds back to the input a signal based upon the state of the two most significant bit positions, i.e., the $b(5)$ and $b(6)$ stages in the counter 113. A blocking circuit 115 monitors all the stages in the counter 113 and prevents the counter 113 from assuming a state in which each stage contains a ONE. If stages $b(0)$ through $b(5)$ are all ONE's the circuit 115 produces a zero output and the next clocking pulse shifts a zero into the $b(0)$ stage of the counter 113. The output of the circuit 115 is the second, or encoding, input to the exclusive OR circuit 111. Thus, the various elements in the encoder 42 combine the incoming digital data signals on the BA lead 40 with a psuedo-random code which repeats each 127 bit times to thereby scramble the digital signals which the shift register 112 receives.

The shift register 112 receives the scrambled digital signals at the bit rate in response to clocking signals from the bit clock divider 101. Pulses from the baud clock divider 104 load the bytes from the shift register 112 into the encoder 44 at the baud rate. Thus, each time the baud clock divider 104 transmits a clocking pulse over the conductor 105, four of the incoming bits are loaded into the encoder 44 in parallel and these are designed $a1'$ through $a4'$ bits in FIG. 5.

The $a3'$ and $a4'$ bits pass to the generator 45 as the $a3$ and $a4$ bits. A standard differential encoder 116 and Gray encoder 117 receive the $a1'$ and $a2'$ signals and transmit encoded $a1$ and $a2$ signals which pass to the coordinate signal generator 45 under the control of signals from the baud clock divider 104.

The coordinate signal generator 45 includes a digital-to-analog unit 120 which converts the incoming $a1$ through $a4$ bits into analog signals which pass through low pass filters 121 and 122 to become the $t(c)$ and $t(s)$ coordinate signals, respectively. Basically, the digital-to-analog unit 120 comprises two sets of switching and summing circuits which respond to signals from the encoder 44, bit rate switch 103 and baud clock 104 provide signals proportional to the normalized $t(c)$ and $t(s)$ values described in FIGS. 4A, 4B and 4C. It is a straightforward implementation and therefore is not shown in any detail.

Normally, the modem transmitter shown in FIGS. 2 and 5 receives incoming digital data signals on the BA lead 40 and converts those digital signals to the $t(c)$ and $t(s)$ coordinate signals which have a set of values which correspond to one of 16 transmission points shown in FIG. 4A. The $t(c)$ and $t(s)$ coordinate signals control the output of modulators 46 and 47 in FIG. 2 for transmitting the modulated carrier signal onto the transmission link 41.

During this transmission operation, the synchronizing control 55 shown in FIGS. 2 and 5 constantly monitors the state of the encoder 42. Referring specifically to FIG. 5, a frame command decoder 123 monitors the state of the counter 113 for a predetermined state which occurs once during each 127 bit clock pulses. Bit clocking pulses from the bit clock 101 are passed to an inverter 124 to provide a clocking input to a flip-flop 125 midway through each bit interval to buffer the output from the decoder 123. Whenever the frame command decoder 123 receives an input corresponding to the predetermined state of the counter 113 (e.g., 1011111), the flip-flop 125 sets and provides a framing signal to an AND gate 126. Other conditions are also monitored in the transmitter before a flip-flop 127 transmits the FRAME signal to the digital-to-analog unit 120 in the coordinate signal generator 45. If the bit rate switch 103 is set for the 9600 bit per second rate, a "9600" signal enables an AND gate 130. If $a4=1$ no framing operations should occur because there is no corresponding framing point in FIG. 4A. Thus, the AND gate 130 and inverter 131 disable the AND gate 126. An OR gate 133 and AND gate 132 receive an $\overline{STUP}$ signal, which is active during normal operations and inactive during training or like intervals, a "4800" signal when the bit rate switch 103 is set to a 4800 bit per second rate and a signal corresponding to the state of the a3 bit. These gates, together with the AND gate 130 and inverter 131 condition the AND gate 126 so it is energized only when the digital data is for one of the predetermined framing points. When the AND gate 126 is energized, it conditions the flip-flop 127 to be set in response to a clocking pulse on the lead 107 which is at one-quarter of the baud rate. Thus, the synchronizing control 55 is periodically enabled to transmit the FRAME signal once each 508 bit pulse or some integer multiple thereof based upon other conditions within the system. When the synchronizing control 55 does transmit the FRAME signal, the digital-to-analog unit 120 produces the correspoiding $t(c)$ and $t(s)$ coordinate signals for the specified framing point.

Thus, the modem transmitter shown in FIGS. 2 and 5 comprises circuits for receiving, scrambling and encoding serial digital data signals to produce a sequence of digital bytes which control a coordinate signal generator. The coordinate signal generator then produces real and imaginary component analog coordinate signals which correspond to determined transmission points or, in response to periodic framing signals, intermittent periodic framing points. The resulting analog coordinate signals modulate the component carriers to produce, on a transmission line, a quadrature amplitude-modulated carrier signal.

Before describing the receiver circuitry in FIG. 6 in further detail, there are defined some timing terms because a knowledge of their meanings and relative values will aid in understanding the specific embodiments of this invention. When specific values are given, they are based upon a set rate of 9600 bits per second and a baud rate of 2400.

In FIG. 6, a clock 140 produces CLK pulses which are fed to a series of dividers. A bit rate switch 141, like the bit rate switch 103 in FIG. 5, controls division in a bit clock divider 142. A baud clock divider 143 produces baud clocking pulses at the band rate. Specifically, the bit clock divider 142 produces 9600 Hz clocking pulses while the baud clock divider produces 2400 Hz clocking pulses. Within the digital equalizer 62, operations are based on past operations. Each baud interval is therefore divided into a number of calculation intervals by a CALC clock divider 144. In addition, a MULT clock divider 145 divides each calculation interval into multiplication intervals. In one specific embodiment, divider 144 defines 36 calculation intervals during each baud interval and the divider 145 defines four multiplication intervals during each calculation interval. Each interval is further divided into sixteen states by the CLK pulses, so, in the specific embodiment, the clock 140 is a 5.5296 mHz clock and the dividers 144 and 145 produce timing pulse train having frequencies of 86.4 kHz and 345.6 kHz, respectively.

All timing is assumed to be directly related to these specific clocking pulses in the following discussion. Certain minor variations in the timing sequence may be necessary to compensate for propogation delays or other timing considerations, however. Also the various circuits shown in FIG. 6 are assumed to contain the necessary buffers and gates to correctly synchronize the various operations.

FIG. 6 shows the details of the analog-to-digital converter 61, the digital equalizer 62, the decoder 66 and the synchronizing control 67 of a receiver, shown in FIG. 3. The analog-to-digital converter 61 comprises the circuits for receiving the $r(c)$ and $r(s)$ analog coordinate signals from the demodulator circuit 60 which are the real and imaginary components. Although these $r(c)$ and $r(s)$ signals would correspond to the $t(c)$ and $t(s)$ signals from the coordinate signal generator 45 in FIG. 2 under ideal conditions, all the previously enumerated influences act to distort the received signals. With respect to FIG. 6, the $r(c)$ and $r(s)$ signals are converted respectively to Y(R) and Y(I) binary representations (e.g., eight-bit numbers). Thus, the converter 61 contains an analog-to-digital circuit 150 and a parallel-to-serial converter 151 for producing the Y(R) signals and transmitting them to the digital equalizer 62 in serial fashion. Likewise, an analog-to-digital circuit 152 and parallel-to-serial converter 153 produce, in serial form, the Y(I) signals which are the binary equivalent of the analog $r(s)$ signal. Each analog-to-digital circuit is a conventional circuit in which the incoming analog signal charges a capacitor for a fixed interval. Then a constant current source discharges the capacitor. The discharging interval, measured by a counter, represents the value of the analog signal.

The $r(c)$ and $r(s)$ analog signals are sampled once during each baud interval; and similarly, the binary representations are transferred into the parallel-to-serial converters 151 and 153 once during each baud interval. The converters 151 and 153 respond to CLK pulses from an AND gate 154 to transmit the Y(R) and Y(I) binary signals in step to the digital equalizer 62.

As the data transfer rate increases over a standard voice channel, the bandwidth limits of that channel begin to distort the signals. There are several known approaches which might be used to compensate for this linear distortion. With "fixed equalization," the simplest, the signals are compensated by passing them through fixed filter circuits. The filter circuits can be adjusted during a "training" period, but the procedure is very time consuming. In any case, once set, the filters can not be adjusted to correct for changes in line conditions. Thus, the effectiveness of fixed equalization deteriorates as line conditions deviate from the conditions existing when the filter circuits initially are adjusted.

Some networks use adaptive equalization to minimize the errors introduced by linear distortion. A measurement of the error is obtained by comparing a received equalized real component signal Z(R) and the corresponding real coordinate signal $t(c)$ for the transmission point and by comparing the received equalized imaginary component Z(I) and the imaginary coordinate signal $t(s)$. The equalization circuits are then adjusted to minimize the error. One equalizer, known as a peak distortion equalizer, operates to minimize an error, $\epsilon$, derived according to:

$$|\epsilon| = |Z(R) - t(c)| + |Z(I) - t(s)| \tag{1}$$

The equalizer 62 shown in FIGS. 4 and 6 uses the mean squared error as an error function derived according to:

$$\epsilon^2 = [Z(R) - t(c)]^2 + [Z(I) - t(s)]^2 \tag{2}$$

This equalizer provides the lowest residual error during normal operations. Residual error is the magnitude of error which remains when an equalizer is providing the best possible equalization. The error can never reach zero in actual practice.

The digital equalizer 62 shown in FIG. 6 transmits to the decision region selection circuit 63 the equalized real component coordinate signal Z(R) and the imaginary component signal Z(I). It calculates the values of these two components from the series:

$$Z(R) = \sum_{i=1}^{n} [X(R)i\ Y(R)i - X(I)i\ Y(I)i] \tag{3}$$

$$Z(I) = \sum_{i=1}^{n} [X(R)i\ Y(I)i + X(I)i\ Y(R)i] \tag{4}$$

The Y(R) and Y(I) terms are the signals received from the analog-to-digital converter 61. The X(R) and X(I) are variable equalizing multipliers which the digital equalizer 62 uses to minimize the error term of formula (2). For a 9600 bit-per-second, 2400-band receiver operating over a standard voice channel, the summation of the first thirty-one terms in the series provides good results.

Two error function components $$\epsilon(R) = Z(R) - t(c) \tag{5}$$

$$\epsilon(I) = Z(I) - t(s) \tag{6}$$

reflect the differences between the equalized decoded real and imaginary component signals and the transmitted real and imaginary coordinate signals respectively. These error components are used to update the equalizing factors so that a new value of each equalizing multiplier X(Rnew)i and X(Inew)i depends upon the previous values X(Rold)i and X(Iold)i modified in accordance with the error functions of formulas 5 and 6. Specifically:

$$X(Rnew)i = X(Rold)i - \alpha\epsilon(R)\ Y(R)i - \alpha\epsilon(I)Y(I)i \tag{7}$$

$$X(Inew)i = X(Iold)i - \alpha\epsilon(I)\ Y(R)i + \alpha\epsilon(R)Y(I)i \tag{8}$$

and X(Rnew)i and X(Inew)i are used as X(R)i and X(I)i during the next baud interval.

Still referring to FIG. 6, the digital equalizer 62 stores the incoming Y(R) and Y(I) signals in shift registers 155 and 156 together with successive previous values. Each shift register can operate in a loading or rotating mode. The first calculation interval of each baud interval is a loading interval. Conrol circuitry, not shown, transmits a LOAD signal which enables the AND gate 154 and conditions multiplexers 157 and 158 to load the Y(R) and Y(I) words into the shift registers 155 and 156. In multiplexer 157, the LOAD signal enables an AND gate 160 to couple the Y(R) signals from the converter 151 through an OR gate 161 to a data input connection of the shift register 155. A DT signal enables an AND gate 163 for the first 32 calculation intervals so that CLK pulses advance the shift register 155.

During the next thirty-one calculation intervals, the control circuitry transmits an ROT signal which enables AND gate 162 so that the output from the shift register 155 passes through the AND gate 162 and OR gate 161 into the shift register 154. Thus, at the end of the first calculation interval, the LOAD signal terminates; and the shift registers 155 and 156 produce, as parallel output signals, the Y(R)i and Y(I)i signals where i advances from 1 to 31 during the successive calculation intervals when the ROT signal is active. These words are loaded in succession into buffer registers 164 and 165 respectively. The outputs of these buffer registers are the Y(R)i and Y(I)i signals and they change during each calculation interval.

Although the digital equalizer 62 operates in synchronism with the clock 40, the incoming r(c) and r(s) signals appear asynchronously. The DT signal becomes inactive after the contents of the shift registers 155 and 156 are loaded and rotated completely (i.e., after 32 calculation intervals). This produces a buffer interval of approximately four calculation intervals.

These successive incoming Y(R)i and Y(I)i binary signals and corresponding X(R)i and X(I)i signals from shift registers 166 and 167 are routed into a real multiplier 170 and an imaginary multiplier 171 in response to signals from a multiplier control 172 to calculate according to formulas (3) and (4). Buffer registes 173 and 174 provide the terms $-\alpha\epsilon(R)$ and $-\alpha\epsilon(I)$ used in the error correction formulas (7) and (8). The multipliers 170 and 171 each operate according to a Booth algorithm which is known in the art; each has four inputs A1 through A4 for receiving the multipliers in series form and four inputs B1 through B4 for receiving multplicands in parallel. The multiplier control 172 selects corresponding ones of the A and B inputs in succesion during each multiplication interval to produce four products in succession. As each product is formed by one of the multipliers, it passes to one of accumulators 175, 176, 180 and 181. The accumulators 175 and 176 then receive, during each baud time, the Z(R) and Z(I) signals which the decision region selection circuit 63 uses; the accumulators 180 and 181 receive information for updating the equalizing factor stored in the shift registers 166 and 167.

The sequence and routing functions for each multiplication interval during each calculation interval are shown in FIG. 7. During multiplication interval 1, the multiplier control 172 routes the outputs of the shift register 166 and buffer register 164 to the A1 and B1 inputs of the real multiplier 170 and the resulting product to the Z(R) accumulator 175. At the same time, it routes the contents of the buffer register 165 and shift register 167 through the imaginary multiplier 171 to the Z(I) accumulator 176. The remaining operations are apparent from FIG. 7.

Referring now to the accumulators 175 and 176 in FIG. 6, at the end of each baud interval, they contain the Z(R) and Z(I) signals in binary notation.

The decision region selection circuit 63 in FIG. 6A receives the Z(R) and Z(I) signals and signals from the bit rate switch 141 (FIG. 6) indicating the bit rate. The circuit 63 comprises a gating array which monitors the values of the incoming Z(R) and Z(I) binary numbers to select a decision region. Once that decision region has been selected, the circuit 63 produces, as an output, digital signals representing the digital value of the selected decision region and, at intermittent periodic times, a FRAME signal which passes to the synchronizing control 67. As such a gating array is straightforward and within the capabilities of one of ordinary skill in this art, it is not disclosed in detail.

The Z(R) and Z(I) binary numbers from the accumulators 175 and 176 in FIG. 6 pass to difference circuits 183 and 184 which receive signals corresponding to the t(c) and t(s) signals of the selected transmission points. Each of the difference circuits 183 and 184 provides an error function according to formulas (5) and (6) which is scaled by a factor $\alpha$. Thus, during each baud interval, buffer registers 173 and 174 receive, respectively, $-\alpha\epsilon(R)$ and $-\alpha\epsilon(I)$ signals. As shown in FIG. 7, the control 172 routes the corresponding products in formulas (7) and (8) to the accumulators 180 and 181 respectively during multiplication intervals 2 and 4. The contents of the accumulators 180 and 181 are summed in adders 185 and 186, respectively, with the old values from the shift registers 166 and 167. As the shift register 166 transfers an equalization factor to the imaginary multiplier 171, it passes through the adder 185 to be altered by the correction factor which appears in the accumulator 180 and based upon the error of the previous baud. Thus each equalizing factor in the shift register 156 and 157 is continuously updated as a function of the received signal in accordance with formulas (5) through (8).

Now referring to the decoder 66 in FIG. 6A, the serial digital signals from the parallel-to-serial converter are coupled to an exclusive OR circuit 190 in response to the bit clock pulses. As successive digital signals pass through the exclusive OR circuit 190, they are combined with signals from a counter 192 and exclusive OR circuit 193 which operate in the same manner as the counter 113 and exclusive OR circuit 114 in FIG. 5. Thus, the signals from the parallel-to-serial converter 65 are decoded, or unscrambled, and clocked into a buffer flip-flop 191 by successive bit clock pulses. The reset output of the flip-flop 191 reflects the data which appeared at the BA lead of the transmitting modem and produces the BB signal.

The synchronizing control 67 monitors the operation of the decision region selection circuit 63 and decoder 66 to prevent any loss of digital synchromism and restore that synchronization if such a loss occurs. Whenever the decision region selection circuit 63 transmits a FRAME signal, the baud clock pulse sets a framing point detection flip-flop 194. A modulo counter 195 advances in response to bit clock pulses with a modulus which corresponds to the modulus of the counter 113 in the synchronizing control 55 in FIG. 5. If the flip-flop 127 in FIG. 5 can be set only every 508 bit intervals, the modulus is 508. A framing point detector 196 detects a predetermined state of the moduluo counter 915 and produces a signal whenever that occurs. If digital synchronism exists, the framing point detector 196 and flip-flop 194 energize an AND gate 197 causing a loading signal to load a preset value from a register 200 into the counter 192 in the decoder 66. This preset value is the same value which the frame command decoder 123 in FIG. 5 senses whenever it sets the flip-flop 125. If the flip-flop 194 in FIG. 6 sets and the framing point detector 196 does not energize the AND gate 197, an inverter 201 and AND gate 202 reset the modulo counter 195 to a predetermined value to thereby re-synchronize the modulo counter 195 and the FRAME signal.

When digital synchronism exists and the synchronizing control 67 jams the counter 192 to a predetermined number, no actual change normally occurs in the counter 192 because the counter 192 will have the proper state. If digital synchronism does not exist, the modulo counter 195 is forced to a synchronized state whereupon the next framing point will cause the AND gate 197 to jam the counter 192 to an appropriate state and restore digital synchronism.

Thus, the modem disclosed in FIGS. 2, 3, 5 and 6 includes circuits for defining a set of decision regions and nominal transmission points within those regions which improves overall response of network, especially a network using modulated carrier signals transmitted over standard telephone voice communications line. There is shown in the specific embodiment a particular set of rectilinear boundaries on a Cartesian coordinate system which define rectangular and non-rectangular decision regions. These regions improve the network response when additive noise, harmonic distortion, phase jitter and frequency offset are present. The disclosed digital equalizer improves network response when linear distortion is present.

It will be apparent that each circuit detailed in FIGS. 5 and 6 is shown by way of explanation only. There are many embodiments which each of the circuits shown in FIGS. 2 and 3 can take. With the specific reference to this invention, the circuitry for establishing transmission points and decoding coordinate signals to select decision regions and corresponding digital values are related to a particular type of data communications network, namely a quadrature amplitude modulation network. It will be apparent that any number of circuits can implement a data communications network which incorporates the various features of this invention. Thus, it is an object of the appended claims to cover all such variations and modifications as come within true spirit and scope of this invention.

What I claim as new and desire to secure by Letters Patent of the United States is:

1. A modem for connection between a digital unit and a transmission link, said modem including a receiver for demodulating a modulated carrier signal received from the transmission link and providing digital signals for the digital unit, said receiver comprising:
   A. means responsive to the receipt of the modulated carrier signal for producing first and second coordinate signals which together represent the amplitude and phase of the carrier signal,
   B. means for comparing the coordinte signals and predetermined levels corresponding to boundaries that define both rectangular and non-rectangular decision regions, each of the boundaries being parallel to one of the axes in a single Cartesian coordinate system thereby to select one decision region, each decision region having a digital value, and
   C. means responsive to the digital value of the selected decision region for transmitting the digital signals.

2. A modem as recited in claim 1 wherein the transmission link linearly distorts the modulated carrier signal and said comparison means includes:
   i. linear distortion compensation means for the first and second coordinate signals providing equalized coordinate signals, and
   ii. a gating array for transmitting the selected digital value in response to the equalized coordinate signals.

3. A modem as recited in claim 2 wherein the decision region boundaries have relative unit magnitudes of 0, 1.25, 2, 3 and 4.

4. A modem as recited in claim 2 wherein first and second coordinate signals are analog signals, said linear distortion compensation means including
   i. means for converting the analog coordinate signals to digital coordinate signals, and
   ii. equalizing means for compensating said digital coordinate signals to generate the equalized coordinate signals.

5. A modem as recited in claim 2 wherein said modulated carrier signal receiving means includes analog signal conditioning means and means for demodulating the received modulated carrier signals.

6. A modem as recited in claim 2 additionally comprising a transmitter for modulating a carrier signal for transmission over the transmission link in response to incoming digital signals, said transmitter including means responsive to the incoming digital signals for producing first and second coordinate signals, each of said transmitted coordinate signals defining a transmission point substantially corresponding to the center of one of said decision regions.

7. A modem as recited in claim 6 adapted for transmitting and receiving digital signals at diverse digital bit rates, said modem additionally comprising a variable bit rate switch for establishing a bit rate signal, said coordinate signal generator in said transmitter and said comparison means in said receiver being responsive to the variable bit rate signal to alter the location of the transmission points and boundaries.

8. A modem as recited in claim 6 wherein the first and second coordinate signals are defined on a Cartesian coordinate system and have relative unit magnitudes taken from the group of magnitudes consisting of 0, 1, 2.707, 3 and 5.

9. A modem as recited in claim 7 wherein said incoming digital data signal responsive means in said transmitter and said receiving means in said receiver include Gray and differential encoders and decoders respectively.

10. A modem for connection between a digital unit and a transmission link, said modem comprising A. a transmitter for receiving digital signals from the digital unit, said transmitter including:
   i. digital to analog conversion means responsive to the digital data for transmitting analog coordinate signals corresponding to transmission points, and
   ii. means responsive to the analog coordinate signals for modulating a carrier signal to produce a quadrature amplitude-modulated carrier signal, and B. a receiver including
   i. means responsive to the received modulated carrier signal for producing first and second analog coordinate signals which together represent the amplitude and phase of the carrier signal,
   ii. means for comparing the analog coordinate signals and predetermined signal levels corresponding to boundaries that define both rectangular and non-rectangular decision regions, each of the boundaries being parallel to one of the axes in a single Cartesian coordinate system thereby to select a decision region, each transmission point used by said transmitter being substantially centered on a decision region and each corresponding transmission point and decision region being assigned to save digital value, and C. means responsive to the digital value of the selected decision region for transmitting digital signals to the digital unit.

11. A modem as recited in claim 10 wherein the coordinate signal magnitudes for transmission points in the transmiter have relative unit magnitudes on a Cartesian coordinate system that are taken from the group of magnitudes consisting of 0, 1, 2,707, 3 and 5 and the boundaries of decision regions in said receiver comparison means have relative unit magnitudes on a Cartesian coordinate system that are taken from the group of magnitudes consisting of 0, 1.25, 2, 3 and 4.

* * * * *

UNITED STATES PATENT AND TRADEMARK OFFICE
CERTIFICATE OF CORRECTION

PATENT NO. : 4.037,049

DATED : July 19, 1977

INVENTOR(S) : David L. Lyon

It is certified that error appears in the above-identified patent and that said Letters Patent are hereby corrected as shown below:

Column 2, Line 15, "degragation" should be --degradation--.
Column 2, Line 63, "signal The" should be --signal. The--.
Column 3, Line 48, "20" should be --30--.
Column 3, Line 53, "communicates" should be --communicate--.
Column 5, Lines 58-59, "of of" should be --of--.
Column 6, Line 22, "Z(A)" should be --Z(R)--.
Column 6, Line 41, "8" should be --0--.
Column 7, Line 7, "accomodated" should be --accommodated--.
Column 7, Line 12, "maxiumum" should be --maximum--.
Column 9, Line 19, "spoiding" should be --sponding--.
Column 9, Line 27, "determined" should be --predetermined--.
Column 9, Line 44, "band" should be --baud--.
Column 11, Line 19, "2400-band" should be --2400-baud--.
Column 11, Line 48, "Conrol" should be --Control--.
Column 12, Line 16, "registes" should be --registers--.
Column 12, Line 24, "succesion" should be --succession--.
Column 13, Line 43, "moduluo" should be --modulo--.
Column 13, Line 43, "915" should be --195--.
Column 14, Line 24, "within true" should be --within the true--.
Column 14, Line 37, "coordinte" should be --coordinate--.
Column 14, Line 65, "signals to" should be --signals thereby to--.
Column 16, Line 29, "transmiter" should be --transmitter--.

UNITED STATES PATENT AND TRADEMARK OFFICE
CERTIFICATE OF CORRECTION

PATENT NO. : 4,037,049

DATED : July 19, 1977

INVENTOR(S) : David L. Lyon

It is certified that error appears in the above-identified patent and that said Letters Patent are hereby corrected as shown below:

Column 16, Line 31, "2,707" should be --2.707--.

Signed and Sealed this

Eleventh Day of December 1979

[SEAL]

Attest:

SIDNEY A. DIAMOND

Attesting Officer

Commissioner of Patents and Trademarks